April 25, 1950
B. M. OLIVER
2,505,061
PHASE INVERTER CIRCUIT
Filed June 30, 1948
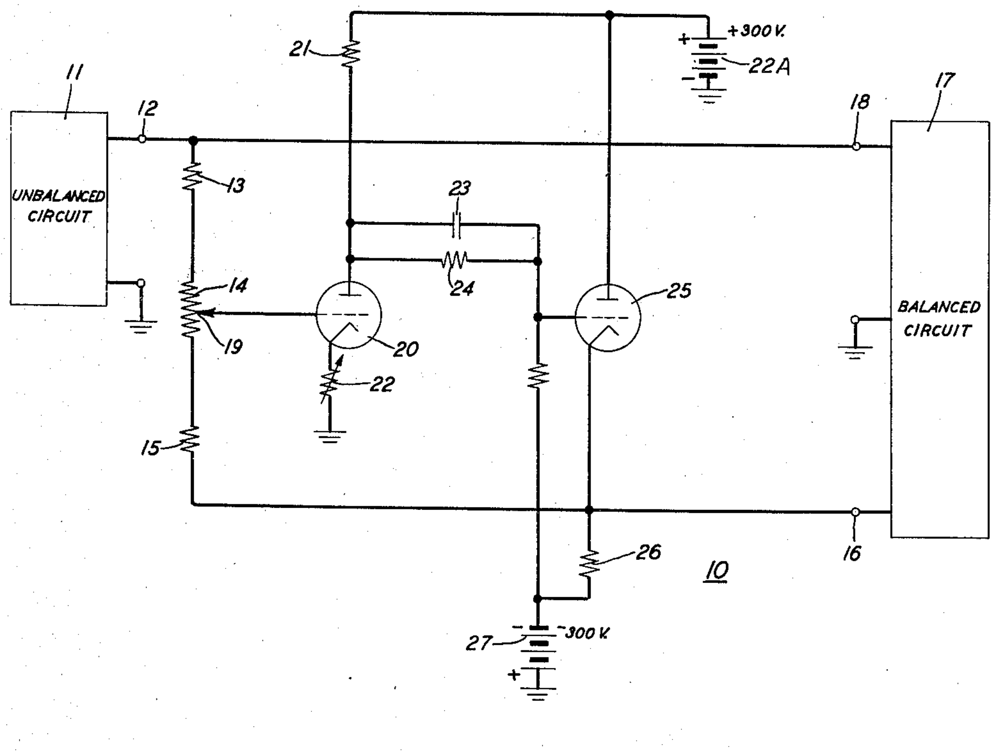
INVENTOR
B. M. OLIVER
BY Hugh S. Wertz
ATTORNEY Patented Apr. 25, 1950 2,505,061

UNITED STATES PATENT OFFICE 2,505,061

PHASE INVERTER CIRCUIT

Bernard M. Oliver, New York, N. Y., assignor to Bell Telephone Laboratories, Incorporated, New York, N. Y., a corporation of New York Application June 30, 1948, Serial No. 36,003

6 Claims. (Cl. 178—44)

This invention relates to coupling circuits and more specifically to circuits of the phase inverter type for coupling an unbalanced line or network to a balanced line or network. This application is a continuation-in-part of application, Serial No. 770,639, filed August 26, 1947.

In the interconnection of an unbalanced circuit, one element of which is customarily connected to ground or to another point of fixed potential, and a balanced circuit, the terminals of which are customarily balanced with respect to ground or to another point of fixed potential, coupling circuits of the so-called phase inverter type are frequently used. In some cases it is desired to transmit signals which include direct current components and, hence, various known phase inverter circuits which employ coupling transformer coils or condensers (which do not pass these direct components) are not suitable for the purpose. While phase inverter circuits which pass direct current components are not new in every case known to the present applicant the balanced output terminals are not, in the absence of a signal, at the same potential.

It is an object of the present invention to transmit in an improved manner signals, which may include direct components, from an unbalanced line or network to a balanced line or network.

It is another object of this invention to provide a phase inverter circuit which transmits direct components of signals and in which, in the absence of signals, both sides of the balanced output produced are at or near ground potential.

In accordance with an illustrative embodiment of the invention, a portion of the unbalanced input signal is amplified in an amplifier tube and to a cathode follower tube which has its cathode connected through a feedback circuit to the control element of the amplifier tube and to one of the balanced output terminals, the other output terminal being connected to the ungrounded input terminal. By properly adjusting the portion of the unbalanced signal fed to the amplifier, the output signals can be accurately balanced.

The invention will be more readily understood by referring to the following description taken in connection with the accompanying single figure of the drawing forming a part thereof.

In the arrangement shown in the drawing, unbalanced input signals from the unbalanced circuit 11 are applied between the terminal 12 and ground. This terminal is connected to one end of a potentiometer comprising the resistances 13, 14 and 15, the other end of the potentiometer being connected to the output terminal 16 connected to the balanced circuit 17. The other output terminal 18 is connected directly to the input terminal 12. An inner variable tap 19 of the resistor 14 is connected to the control grid of the tube 20. The anode of this tube is connected through a resistor 21 to the +B terminal of a suitable source 22A of direct potential of, for example, 300 volts. The cathode is connected through a resistor 22 to ground while the anode is connected through a coupling condenser 23 shunted by a resistor 24 which permits the passage of the direct components of the signal to the control element of the tube 25. The cathode of this tube is connected through the resistor 26 to the negative terminal of a suitable source of potential 27 of about 300 volts, the positive terminal of which is connected to ground. The anode of tube 25 is connected directly to the positive terminal of the source 22. The cathode of the tube 25 is connected directly to the terminal 16.

The operation of the circuit shown in the drawing will now be described. Assume a small direct positive potential is applied between the input terminal 12 and ground. By means of the tap 19 on the resistor 14 a positive potential is applied to the input of the tube 20 which causes a negative potential to be applied to the grid of the tube 25. Because of the cathode follower output connection, the terminal 16 also assumes a negative potential. By properly adjusting the position of the tap 19, the output at the terminal 16 can be made as far below ground as the input terminal 12 (and hence the output terminal 18) is above ground.

Various other modifications can be made in the embodiment of the invention described above without departing from the spirit thereof, the scope of which is indicated in the claims.

What is claimed is:

1. A phase inverter circuit for producing across its output terminals output voltages which are balanced with respect to some fixed potential from unbalanced input voltages which are applied to a pair of input terminals one of which is maintained at said fixed potential, comprising a first tube having an anode, a cathode and a control element, a second tube having an anode, a cathode and a control element, a potentiometer between said output terminals, means for applying operating potentials to the anodes of said tubes, respectively, means for connecting an inner terminal of said potentiometer to the control element of said first tube, means for connecting the anode cathode circuit of said first tube to the control element of said second tube, means for biasing the cathode of said second tube to a negative potential with respect to said fixed potential, means for connecting the input terminal not at said fixed potential to one of said output terminals, and means for connecting the cathode of said second tube to the other of said output terminals.

2. A phase inverter circuit for producing across a pair of output terminals output voltages which are balanced with respect to some fixed potential from unbalanced input voltages which are applied to a pair of input terminals one of which is maintained at said fixed potential, comprising means for connecting the input terminal which is not fixed in potential to one of said output terminals, means for amplifying a portion of said input voltage, a cathode follower tube having an anode, a cathode and a grid, means for applying said amplified voltage to the grid of said cathode follower tube, means for applying operating potential to the anode of said tube, means for feeding back energy from the cathode of said cathode follower tube to the input of said amplifier, and means for connecting said cathode to the other of said output terminals.

3. The combination of elements as in claim 2 in further combination with means for biasing the control grid of said cathode follower tube negative.

4. The combination of elements as in claim 2 in further combination with means for varying the amount of feedback to said amplifier.

5. A phase inverter circuit for producing across its output terminals output voltages which are balanced with respect to some fixed potential from unbalanced input voltages which are applied to a pair of input terminals one of which is maintained at said fixed potential, comprising a first tube having an anode, a cathode and a control element, a second tube having an anode, a cathode and a control element, a potentiometer between said output terminals, means for applying operating potentials to the anodes of said tubes, respectively, means for connecting an inner terminal of said potentiometer to the control element of said first tube, means for connecting the anode cathode circuit of said first tube to the control element of said second tube through a coupling which passes direct current, means for biasing the cathode of said second tube to a negative potential with respect to said fixed potential, means for connecting the input terminal not at said fixed potential to one of said output terminals, and means for connecting the cathode of said second tube to the other of said output terminals.

6. A phase inverter circuit for producing across a pair of output terminals output voltages which are balanced with respect to some fixed potential from unbalanced input voltages which are applied to a pair of input terminals one of which is maintained at said fixed potential, comprising means for connecting the input terminal which is not fixed in potential to one of said output terminals through a connection which passes direct current, means for amplifying a portion of said input voltage, a cathode follower tube having an anode, a cathode and a grid, means for applying said amplified voltage to the grid of said cathode follower tube, means for applying operating potential to the anode of said tube, means for feeding back energy from the cathode of said cathode follower tube to the input of said amplifier, and means for connecting said cathode to the other of said output terminals.

BERNARD M. OLIVER.

REFERENCES CITED

The following references are of record in the file of this patent:

UNITED STATES PATENTS

| Number | Name | Date |
|---|---|---|
| 2,199,820 | Gannett | May 7, 1940 |
| 2,390,824 | Berry | Dec. 11, 1945 |